United States Patent [19]

Achikita et al.

[11] Patent Number: 5,135,977

[45] Date of Patent: * Aug. 4, 1992

[54] INJECTION MOLDING COMPOSITION

[75] Inventors: Masakazu Achikita, Kashiwa; Akihito Ohtsuka, Sakura, both of Japan

[73] Assignee: Sumitomo Metal Mining Co., Ltd., Tokyo, Japan

[ * ] Notice: The portion of the term of this patent subsequent to Jul. 9, 2008 has been disclaimed.

[21] Appl. No.: 592,785

[22] Filed: Oct. 4, 1990

[51] Int. Cl.$^5$ ................................................ C08K 5/55
[52] U.S. Cl. .................................... 524/183; 524/441; 524/487
[58] Field of Search ...................... 524/183, 487, 441

[56] References Cited

U.S. PATENT DOCUMENTS 5,030,677 7/1991 Achikita et al. .................... 524/487

Primary Examiner—Joseph L. Schofer
Assistant Examiner—Peter D. Mulcahy
Attorney, Agent, or Firm—Watson, Cole, Grindle & Watson

[57] ABSTRACT

A powder metallurgy product delicate in shape is obtained with high efficiency in binder expulsion by using an injection molding composition including a sintering alumina powder and a binder, the binder including therein, in gravimetric ratio, 10 to 80% of a low-density polyethylene, 10 to 80% of a paraffin type wax and 5 to 35% of a boric ester, and the volumetric mixing ratio of the sintering powder to the binder is 30 to 70% of the former component to 70 to 30% of the latter component.

8 Claims, No Drawings

INJECTION MOLDING COMPOSITION

BACKGROUND OF THE INVENTION

1. Field of the Invention

This invention relates to an injection molding composition used in producing a precision machine part having a delicate shape by injection molding an alumina powder and sintering the molded mass.

2. Description of the Prior Art

Heretofore, the method of powder metallurgy has yielded a sintered product by a procedure which comprises press molding a molding powder composition and then sintering the molded mass. It has been difficult using this method to manufacture products having three-dimensionally complicated shapes on products possessing thin-wall parts and knife-edge parts.

In order to overcome these drawbacks, a method has been proposed which obtains a sintered product by injection molding in a die of a prescribed shape an injection molding composition comprising a molding powder and a binder, heating the injection molded mass, thereby expelling the binder therefrom, and then subjecting the heated molded mass to a sintering treatment (Japanese Patent Application Disclosure SHO 57(1982)-16,103 and Japanese Patent Application Disclosure SHO 57(1982)-26,105).

Since this method requires the use of a powder having an average particle diameter of not more than 10 μm, it enables manufacture of a product of high sintering density; however, it necessitates a long time for the expulsion of the binder. As a result, the cost of production is high.

If a binder having a high decomposition speed is used in order to shorten the time for the expulsion of the binder, the decomposition gas arising during the course of the binder expulsion is liable to cause flaws such as cracks, blisters and deformation in the molded mass. Although an attempt has been made to use a binder of a low decomposition speed and a binder of a high decomposition speed in a suitably mixed state, no improvement in the property of binder expulsion has been achieved.

The expression "improvement in the property of binder expulsion" as used herein refers to a decrease in the time needed to complete expulsion of the binder, a lowering of the temperature needed to effect the treatment for binder expulsion, and a reduction in flaws such as cracks, blisters, and deformation in the molded mass during the course of binder expulsion.

An object of this invention is to provide an injection molding composition which, in the injection molding of a precision part from alumina powder as a raw material, contributes advantageously to improving the property of binder expulsion which the conventional composition has failed to attain.

SUMMARY OF THE INVENTION

The inventors, with a view to solving the problem mentioned above, have conducted a study on the mixing ratio (volumetric ratio) of the alumina powder and a binder and on the gravimetric ratio of the components of the binder over an extensive range. They have consequently found that the solution of the problem is attained by using an injection molding composition comprising a sintering alumina powder and a binder, the binder incorporating therein, in gravimetric ratio, 10 to 80% of a low-density polyethylene, 10 to 80% of a paraffin type wax, and 5 to 35% of a boric ester, and the volumetric mixing ratio of the sintering powder to the binder is 30 to 70% of the former component to 70 to 30% of the latter component.

DETAILED DESCRIPTION OF PREFERRED EMBODIMENT

For the injection molding composition of this invention, alumina powder is used as the sintering powder, a commercially available low-density polyethylene is used as the low-density polyethylene in the binder, and ordinary paraffin wax is used as the paraffin type wax. The boric ester is at least one member selected from among triglycol diborates, trialkyl borates, glycerol borates, glycerol borates, and alkyne diborates. More specifically, triglycol diborates include 1,6-bis(5-ethyl-4-propyl-1,3,2-dioxabora-2-cyclohexyloxy) hexane and 1,4-bis(5-ethyl-4-propyl-1,3,2-dioxabora-2-cyclohexyloxy) butane, trialkyl borates include trimethyl borate, triethyl borate, tributyl borate, and triamyl borate, the glycerol borates include glycerol borate stearate and polyoxyethylene glycerol borate palmitate, and the alkylene diborates include methyl diborate and ethyl diborate, for example. Among other boric esters mentioned above, triglycol diborates prove to be particularly desirable.

These boric esters may be used either singly or in the form of a combination of two or more members. When this boric ester is mixed with other components, it is desired to be in the form of a solution obtained by dissolving the boric ester in a concentration in the range of 60 to 80% by weight in a solvent such as, for example, benzene, toluene, or xylene. As a result, the mixing property of the alumina powder with the organic binder is conspicuously improved. In this case, therefore, the binder composition is destined to contain a fixed amount of the solvent as one component thereof.

As the equipment or apparatus to be used in injection molding the composition this invention, any of equipment or apparatuses which have been used for injection molding conventional plastic materials can be used in their unmodified form. The injection molding is carried out at a temperature in the range of 80° to 200° C. and under a pressure in the range of 500 to 2,000 kg/cm².

When a precision molded article is to be produced with the aforementioned equipment using the composition of this invention, the treatment for binder expulsion can be accomplished by heating the molded mass at a temperature in the range of 250° to 300° C. at a temperature increasing rate in the range of 12° to 30° C./hr in an atmosphere of an inert gas or a reducing gas when the powder is susceptible of oxidation or in the open air or in an atmosphere of an inert gas. For a conventional composition to enable manufacture of the same molded product, the heat treatment must be carried out at a high temperature in the range of 400° to 550° C. at a low temperature increasing rate in the range of 1° to 10° C./hr. Since the injection molding composition of this invention obviates the necessity for such a high-temperature treatment, it can immensely improve the efficiency of the treatment of binder expulsion.

The injection molding composition of this invention, as already described, undergoes first a treatment for injection molding, then a heat treatment for binder expulsion, and subsequently a sintering treatment. For the reason to be given specifically herein below, so long as the range of composition of the components defined by gravitational ratio (% by weight) and the mixing ratio defined by volumetric ratio (% by volume) are observed, the treatment for binder expulsion can be advantageously accomplished by heating the injection molded mass in the atmosphere of a reducing gas or in the open air or in an atmosphere of an inert gas at a temperature in the range of 250° to 300° C. at a temperature increasing rate approximately in the range of 12° to 30° C./hr. The advantage of this invention can be evaluated clearly by comparing these temperature conditions with those used in the treatment of binder expulsion performed on the molded mass using a conventional composition, i.e., the heat treatment at a temperature in the range of 400° to 500° C. at a temperature increasing rate in the range of 1° to 10° C./hr. The range of composition of the components and the mixing ratio are limited for the following reason. The volumetric ratio of alumina powder as the sintering powder is defined by a range of 30 to 70%. If the volumetric ratio of the alumina powder is less than 30%, the fluidity required for the work of injection molding is not easily imparted to the composition and the work of injection molding cannot be carried out and the density of the sintering powder packed in the injection molded mass is low and the density of the finally produced sintered article cannot be easily improved.

Conversely, if the volumetric ratio of the sintering powder exceeds 70%, the injection molding property of the composition is seriously impaired because the injection molding strength is inferior or the injection molded article tends to sustain a flaw called a sunken surface.

The composition of the binder is defined as containing a low-density polyethylene in a concentration in the range of 10 to 80% by weight. If the low-density polyethylene content is less than 10% by weight, the injection molded article is deficient in strength and shape-retaining property and, in spite of a decrease in the time required for the treatment for binder expulsion, the shaped article tends to sustain cracks in the surface thereof. If this content exceeds 80% by weight, the time required for the treatment of binder expulsion is unduly long.

Further, the binder is defined to contain a paraffin type wax in a concentration in the range of 10 to 80% by weight. If the paraffin type wax content is less than 10% by weight, the composition is deficient in injection molding property and the time for the treatment of binder expulsion is unduly long and, at the same time, the temperature for the heat treatment for the expulsion of binder is unduly high.

Conversely, if the paraffin type wax content exceeds 80% by weight, the injection molded article is deficient in strength and shape-retaining property and liable to cease to tolerate the impact of handling.

Finally, the boric ester content is defined to be in the range of 5 to 35% by weight. The boric ester is intended to improve the miscibility of the sintering powder with the binder and ensure uniform distribution of the powder, and finally to improve the density and dimensional accuracy of the sintered article for the purpose of stabilizing the treating property for the expulsion of binder. If the boric ester content is less than 5% by weight, the molded article resulting from the expulsion of binder tends to sustain flaws in terms of porosity because the improvement in miscibility is not attained. If this content exceeds 35% by weight, the molded article is deficient in strength.

It has been confirmed that the composition, in the course of preparation by combination of the components, is allowed to incorporate therein less than 20% by weight of stearic acid without a sacrifice of its effect for the purpose of improving the release property of the shaped article from the die at the time of injection molding.

EXAMPLE

Sintered products of a shape having a sharp edge were manufactured from combinations using alumina powder 0.5 μm in average particle diameter and containing various binders possessing compositions shown in Table 1.

To be more specific, the alumina powder and a varying binder added thereto in an amount shown in Table 1 were kneaded and injection molded in the shape of a gear. During the course of this injection molding, the composition was tested for injection molding property. The results are shown in Table 1.

Then, the injection molded article was heat-treated in an atmosphere of air until the residual binder content decreased below 1% by weight as determined by comparing the weights of the shaped article obtained before and after the heat treatment. Then, the heat-treated molded article was calcined and then left cooling in the furnace to room temperature. Then, the appearance of the shaped article was examined. The results of the observation are shown in combination with the heating temperature of the binder and the time of heating in Table 1.

When the molded article of good appearance was subjected to a sintering treatment at 1,250° C. for one hour, there was obtained a sintered article of fine quality. Platelike test pieces taken from the sintered articles in accordance with the standard of "Powder Metallurgy Technique Society" were tested for strength. The results are shown in Table 2. The values indicated in this table represent averages of test results obtained each in five runs of test.

Conventional Examples 1 to 3 represent cases in which the molded masses were apparently good but suffered inferior results of binder expulsion.

Experiments 1 to 8 represent cases in which either ranges of composition of components or mixing ratios of components deviated from those defined by the present invention. Experiments 1 and 2 are cases in which ranges of composition of components fell within the range of the present invention and the mixing ratios of components deviated from the range of this invention, whereas Experiments 3 to 8 are cases in which the ranges of composition deviated from the range of this invention and the mixing ratios of components fell within the range of this invention. The defect of Experiment 1 resided in the inability of the composition to produce a molded mass, that of Experiment 2 in the occurrence of a sunken surface in the molded mass of the composition, that of Experiment 3 in the inability of the composition to produce a molded mass, and that of Experiment 4 in the inevitability of subjecting the molded mass of the composition to an extended heat treatment at a high temperature in spite of good moldability of the composition and good appearance of the molded mass. The defect of Experiment 5 resides in the deficiency in the strength of the molded mass of the composition, that of Experiment 6 in the inevitably of the molded mass requiring an extended heat treatment at a high temperature, that of Experiment 7 in the inability of the composition to produce a molded mass, and that of Experiment 8 in the unwanted separation of the binder from the composition. In contrast, the compositions of Examples 1 to 5 showed high satisfactory moldability in heat treatments performed for a shorter periods, 16 to 26 hrs, at lower temperatures, 250° to 300° C., than those required heretofore and produced molded masses of good appearance.

TABLE 1

| Example No. | Binder Composition | Ratio | | Injection moldability | Binder removability Temperature required | Time required | Appearance |
|---|---|---|---|---|---|---|---|
| Conventional Example | | | | | | | |
| 1 | Ethylene-ethyl acrylate copolymer | 38 | 18 | Good | 450° C. | 90 hr | Good |
|  | Paraffin wax | 38 | | | | | |
|  | Dibutyl phthalate | 13 | | | | | |
|  | Stearic acid | 11 | | | | | |
| 2 | Polyphenylene sulfide | 68 | 28 | Good | 550° C. | 140 hr | Good |
|  | Polypropylene | 25 | | | | | |
|  | Ethylene bis-stearoamide | 7 | | | | | |
| 3 | Microcrystalline wax | 83 | 11 | Good | 800° C. | 800 hr | Good |
|  | Stearic acid | 17 | | | | | |
| Experiment | | | | | | | |
| 1 | Paraffin wax | 60 | 25 | Not moldable | — | — | — |
|  | Polyethylene (fluidity 200) | 20 | | | | | |
|  | Boric ester type dispersant | 20 | | | | | |
| 2 | Paraffin wax | 60 | 75 | Sunken surface in molded mass | — | — | — |
|  | Polyethylene (fluidity 200) | 20 | | | | | |
|  | Boric ester type dispersant | 20 | | | | | |
| 3 | Paraffin wax | 83 | 50 | Not moldable | | | |
|  | Polyethylene (fluidity 200) | 11 | | | | | |
|  | Boric ester type dispersant | 6 | | | | | |
| 4 | Paraffin wax | 11 | 50 | High molding pressure | 500° C. | 80 hr | Good |
|  | Polyethylene (fluidity 200) | 83 | | | | | |
|  | Boric ester type dispersant | 6 | | | | | |
| 5 | Paraffin wax | 30 | 40 | Low strength of molded mass | — | — | — |
|  | Polyethylene (fluidity 200) | 30 | | | | | |
|  | Boric ester type dispersant | 40 | | | | | |
| 6 | Paraffin wax | 8 | 65 | High molding pressure | 450° C. | 75 hr | Good |
|  | Polyethylene (fluidity 200) | 77 | | | | | |
|  | Boric ester type dispersant | 15 | | | | | |
| 7 | Paraffin wax | 77 | 45 | Not moldable | — | — | — |
|  | Polyethylene (fluidity 200) | 8 | | | | | |
|  | Boric ester type dispersant | 15 | | | | | |
| 8 | Paraffin wax | 70 | 36 | Separation of binder | 250° C. | 18 hr | Porous |
|  | Polyethylene (fluidity 200) | 27 | | | | | |
|  | Boric ester type dispersant | 3 | | | | | |
| Example | | | | | | | |
| 1 | Paraffin wax | 60 | 50 | Good | 250° C. | 16 hr | Good |
|  | Polyethylene (fluidity 200) | 20 | | | | | |
|  | Boric ester type dispersant | 20 | | | | | |
| 2 | Paraffin wax | 40 | 45 | Good | 250° C. | 26 hr | Good |
|  | Polyethylene (fluidity 250) | 40 | | | | | |
|  | Boric ester type dispersant | 20 | | | | | |
| 3 | Paraffin wax | 65 | 55 | Good | 250° C. | 26 hr | Good |
|  | Polyethylene (fluidity 150) | 15 | | | | | |
|  | Boric ester type dispersant | 20 | | | | | |
| 4 | Paraffin wax | 20 | 55 | Good | 300° C. | 24 hr | Good |
|  | Polyethylene (fluidity 200) | 60 | | | | | |
|  | Boric ester type dispersant | 20 | | | | | |
| 5 | Paraffin wax | 60 | 50 | Good | 250° C. | 16 hr | Good |
|  | Polyethylene (fluidity 200) | 20 | | | | | |
|  | Boric ester type dispersant | 15 | | | | | |
|  | Stearic acid | 5 | | | | | |

Composition of binder indicated in % by weight and ming ratio in % by volume.

TABLE 2

| Sample No. | Three-point bending strength after sintering. kg/mm$^2$ |
|---|---|
| Conventional Example | |
| 1 | 61.0 |
| 2 | 59.3 |
| 3 | 57.4 |
| Experiment | |
| 4 | 57.2 |
| 6 | 58.9 |

TABLE 2-continued

| Sample No. | Three-point bending strength after sintering. kg/mm$^2$ |
|---|---|
| Example | |
| 1 | 62.2 |
| 2 | 60.1 |
| 3 | 58.2 |
| 4 | 57.3 |
| 5 | 62.3 |

In the injection molding of a precision ceramic part using alumina powder, this invention easily allows a generous reduction in the time required for the heat treatment for binder expulsion without any sacrifice of the quality in the finally obtained product. It, therefore, allows manufacture by the injection molding method of such powder metallurgy products as thin-walled parts of complicated shape inexpensively in a stable state. Thus, this invention contributes immensely to the field of precision industry.

What is claimed is:

1. An injection molding composition comprising a sinterable alumina powder and a binder, said binder including therein, in gravimetric ratio, 10 to 80% of a low-density polyethylene, 10 to 80% of a paraffin wax, and 5 to 35% of a boric ester, and the volumetric mixing ratio of said sintering powder to said binder is 30 to 70% of the former component to 70 to 30% of the latter component.

2. A composition according to claim 1, wherein said boric ester is at least one member selected from the group consisting of triglycol diborates, trialkyl borates, glycerol borates, and alkyne diborates.

3. A composition according to claim 2, wherein said boric ester is mixed with the other components in the form of a solution obtained by dissolving said boric ester in a concentration in the range of 60% to 80% by weight in one solvent selected from among benzene, toluene, and xylene.

4. A composition according to claim 1, wherein the injection molding is carried out at a temperature in the range of 80° to 200° C. under a pressure in the range of 500 to 2,000 kg/cm$^2$.

5. A composition according to claim 1, wherein the treatment for removal of said binder is carried out at a temperature in the range of 250° to 300° C. at a temperature increasing rate in the range of 12° to 30° C./hr.

6. A composition according to claim 5, wherein said treatment is carried out in an atmosphere of inert gas or reducing gas where said powder is susceptible of oxidation.

7. A composition according to claim 5, wherein said treatment is carried out in the open air or an atmosphere of inert gas where said powder is insusceptible of oxidation.

8. A composition according to claim 1, wherein said binder further incorporates therein less than 20% by weight of stearic acid.

* * * * *